July 13, 1943. C. F. CAMPIGLIA 2,324,194
FIRST AID KIT
Filed May 18, 1942 2 Sheets-Sheet 2
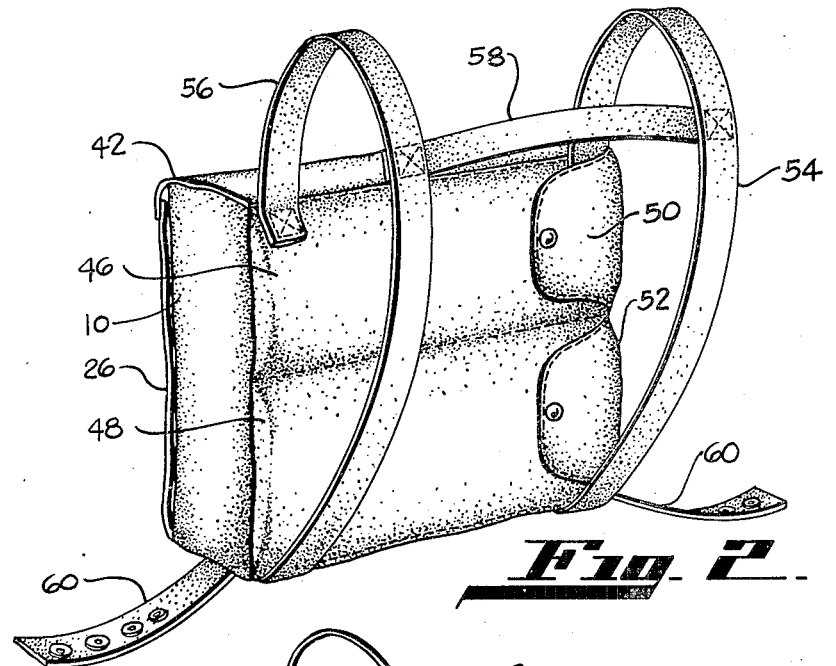
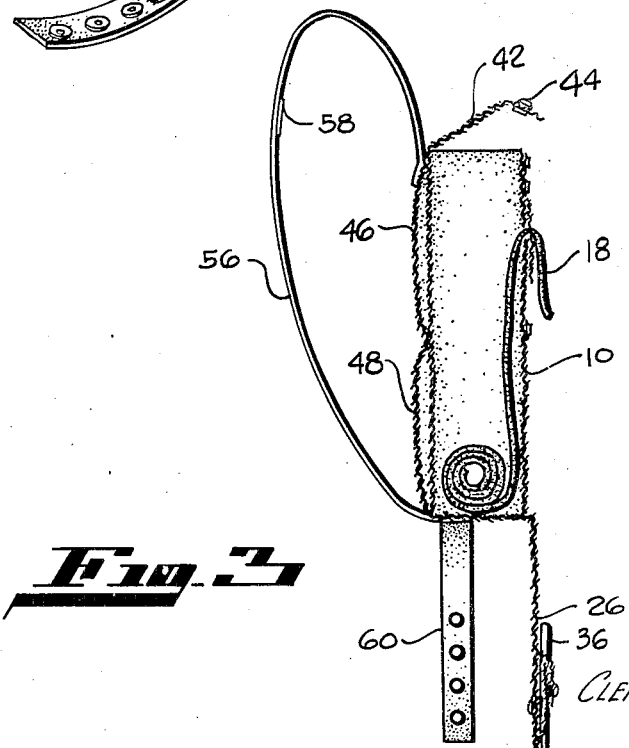
CLEMENTINE F. CAMPIGLIA
INVENTOR.
BY J. Edwin Coates
ATTORNEY Patented July 13, 1943

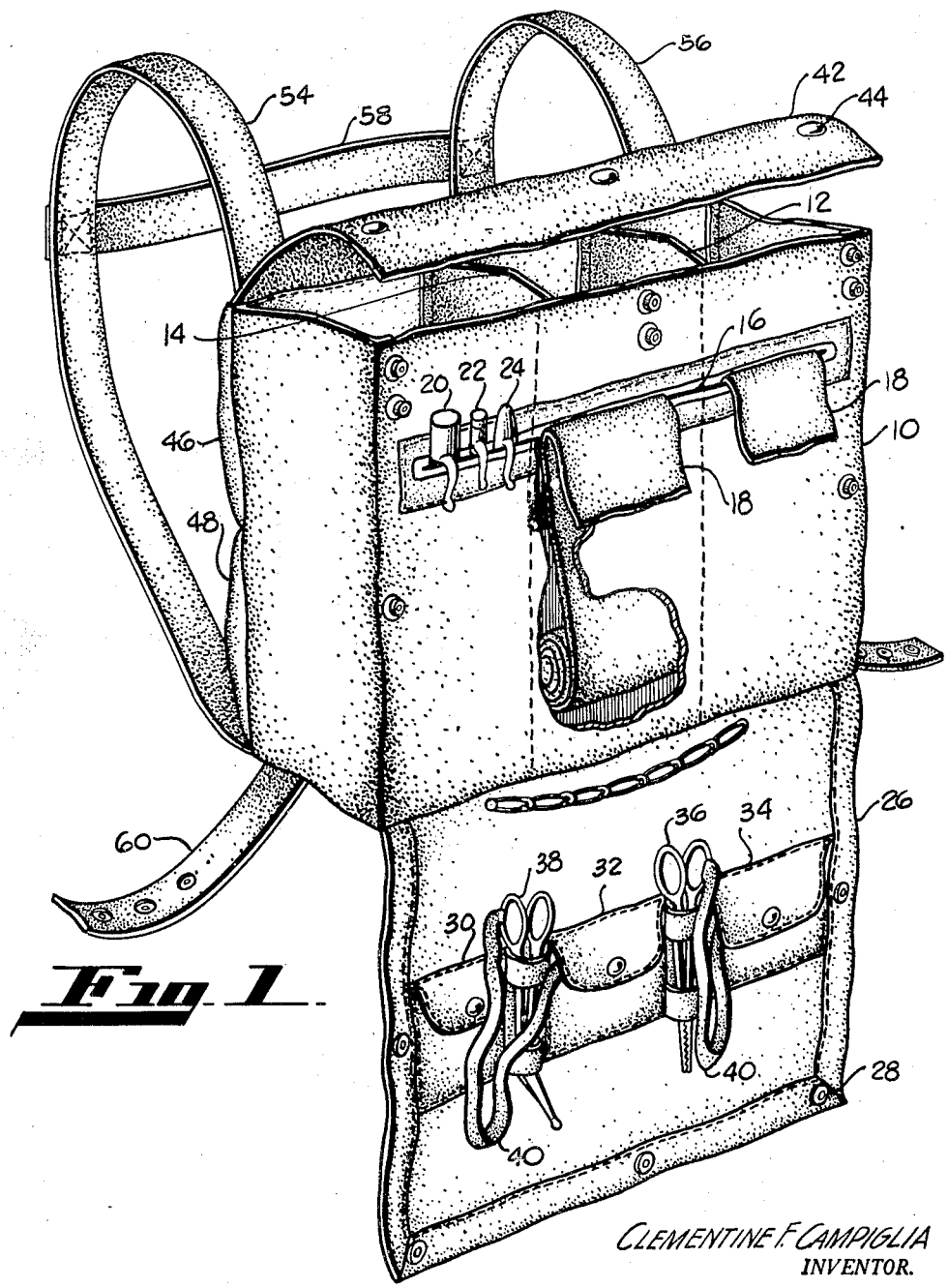

2,324,194

UNITED STATES PATENT OFFICE 2,324,194

FIRST-AID KIT

Clementine F. Campiglia, Santa Monica, Calif., assignor to Douglas Aircraft Company, Incorporated, Santa Monica, Calif.

Application May 18, 1942, Serial No. 443,446

2 Claims. (Cl. 224—5)

This invention relates to an improved first aid kit and more specifically to a first aid kit adaptable for use in the field under the adverse conditions customarily encountered in such work.

It is well known that in war operations, and particularly on the battle fields, the need for first aid treatment is great and the facilities for properly administering it are very poor. Doctors and nurses are accustomed to going directly to the wounded man wherever he may be, not knowing the type of first aid required until they have actually examined the patient. Consequently, it is desirable that a compact, body-attached kit be provided for these people, which kit must include as complete a variety of equipment as possible without making the kit so bulky or cumbersome as to hamper the freedom of movement of the wearer.

Needless to say, the necessity for these kits, at the present time, is multiplied since it is now almost common practice for enemy aircraft to bomb cities and injure large numbers of the civilian population. This condition has brought about the need for a first aid training program among the civilian population which, because of lack of time and the possible unsuitability of many of the people trained for first aid work, is not as proficient as it might otherwise be. It is, therefore, desirable that the kit should be relatively fool-proof. That is to say, it should contain items of equipment which are particularly suitable for use by the layman and these items of equipment should be arranged so as to keep possible mistakes at a minimum.

In the kit of my invention, I have arranged the various pockets in a particular manner and made them of a size which corresponds to the size of standard bottles, packages and the like, so that it will be impossible for one medicine, say morphine, for example, to be placed in any other than its prescribed location in the kit thereby precluding the mistaken use thereof.

For field work, it is extremely desirable that a first aid kit of any kind be strapped over the shoulders and hung upon the chest of the person in a manner instantly accessible from the carried position. I have further arranged the kit so that all parts thereof may be instantly accessible.

Accordingly, it is the principal object of my invention to provide a body-attached first aid kit for use in emergency field work, which kit does not hinder the movement of the wearer and is adapted to be opened from the carried position with all pockets and equipment items in the proper position for use while the wearer is administering first aid to the patient.

It is a further object to provide a first aid field kit with a false front thereon, which front may be laid open and supported by the body of the wearer while the kit is in use. Another object of my invention is to provide a plurality of pockets in the first aid kit, which pockets shall not interfere with each other. A still further object is to provide a novel bandage dispensing means which is uncovered for use only when the kit has been laid open. Another object is to provide a compact first aid kit which is relatively waterproof and adapted to protect the contents thereof from the weather.

Another object lies in the provision of a first aid kit of compact size having pockets arranged therein for necessary items of equipment which pockets are disposed so as to utilize the dimension of the kit to the greatest advantage. For example, horizontally disposed muff-type pockets are provided on the back of the kit to accommodate the longer items of equipment, such as splints, and the like.

Other and further objects will become apparent after reading the following specification in connection with the drawings in which:

Figure 1 is a perspective view looking into the front of the first aid kit of my invention showing the kit laid open for use.

Figure 2 is a perspective view looking into the rear of the kit showing the muff-type pockets and the carrying strap arrangement; and Figure 3 is a side elevational view in section showing the kit laid open for use as in Figure 1.

With reference now to Figure 1, the kit comprises a moderately flat rectangular bag 10, having vertically disposed partitions 12 and 14 which divide the interior of the kit into three pockets extending the full height thereof. On the front face of the kit, a slot 16 has been provided in each of the pockets mentioned. As shown in Figure 1, the two slots at the right of the drawing are used to dispense rolled bandages, 18, which may be placed in the corresponding pockets and threaded through their respective slots. A portion of the bag is cut away to show the manner in which the bandages may be placed in the pockets. With this arrangement the only part of the bandage material which need be touched is that which is about to be used. The remainder is effectively protected against dirt and possible source of infection. The slot at the left may be used for a pen-type light 20, a pencil 22, and a fountain pen 24.

As has been stated, Figure 1 shows the kit laid open for use, in which case a flap or false front hangs from the bottom of the bag 10. The flap may be sewed or otherwise fastened along the bottom edge of the bag in the manner of a hinge so that it can be raised into an overlying relationship with the front of the bag and snapped into position with a plurality of fasteners 28. The flap 26 is provided with a plurality of pockets 30, 32 and 34, preferably of different sizes so as to hold specific items of equipment. For example, the pocket 30 may be of a size to hold a standard size bottle of liquid morphine; pocket 32 may be of a size to accommodate a hypodermic needle, individual swabs, etc., and pocket 34 may be outfitted with complete eye treatment equipment. Between the pockets, loops are provided for various instruments—a hemostat 36, special bandage cutting scissors 38 or the like. These instruments are securely attached with tapes 40 to the kit so that in the event they are dropped they may be quickly retrieved.

The large vertically disposed pockets formed by the partitions 12 and 14 are closed by a cover 42, which is snapped into position with fasteners 44 and provided with an extra long flap adapted to overlie the upper open edge of the false front 26, when it is in the closed position. This is for the purpose of preventing rain, for example, from entering the space between the false front 26, and the front face of the bag 10.

On the rear of the bag there are provided two relatively large horizontally disposed muff-type pockets 46 and 48, as best shown in Figures 2 and 3. These pockets are closed by flaps 50 and 52 and are easily accessible. They are particularly adaptable for carrying the longer necessary items such as splints and possibly a thermos bottle, etc.

The harness for attaching the kit to the wearer is of the conventional type consisting of two shoulder straps 54 and 56, a tie strap 58 connecting the shoulder straps, and a cinch strap 60, which is adapted to pull the kit tightly to the body.

It will be noted that when the kit is hanging open and the flap 26 has been lowered in the subtending position, the pockets 30, 32 and 34 and the instruments are then in an upright position available for instant use. This flap is in such a position as to be supported by the lower portion of the body when the wearer is in the position of administering first aid to a patient. In this way every pocket and every item of equipment is easily and instantly accessible to the hands of the wearer, which needless to say, is extremely desirable in emergency cases where a saving of time is so important.

While I have shown my invention in its preferred embodiment, it will be obvious to those skilled in the art, that various changes and modifications may be made therein, without departing from the scope thereof as defined in the appended claims.

I claim:

1. In a kit for emergency first aid equipment, the combination of: a rectangular bag of moderate thickness; strap means attached to the bag for hanging the bag flat against a person's chest; a front flap overlying the front wall of the bag and fixed to the bottom thereof in the manner of a hinge so as to be capable of being dropped quickly to a depending position with the inner face thereof away from the wearer, the strap means, bag and flap being dimensioned, shaped and related to dispose the flap supportedly against the lower portion of the body of the wearer when the flap is in open position and the wearer is in the bended-knee position of administering first aid to a patient; means for securing the outer edge of the flap to the front wall of the bag; holding means on the inner face of the flap for readily removably holding first aid articles for holding them against accidental downward displacement when the flap depends; partitions forming upwardly opening compartments extending between the front and rear walls of the bag; a top flap hinged to the rear wall of the bag and overlying the top openings of said compartments, means for securing said top flap to the front wall of the bag above said means for securing the front flap; a free flange on said top flap which overlaps the upper edge of the front flap in a manner permitting dropping the front flap without unfastening the top flap, and the front wall of said bag being provided with access means leading into at least some of said compartments.

2. The combination defined in claim 1 in which said access means are in the form of slits in the front wall of the bag and said compartments are laterally alined across the bag behind said front wall.

CLEMENTINE F. CAMPIGLIA.